(12) United States Patent
Chakra et al.

(10) Patent No.: US 9,706,388 B2
(45) Date of Patent: Jul. 11, 2017

(54) WIRELESS NETWORK IDENTIFICATION

(71) Applicant: International Business Machines Corporation, Armonk, NY (US)

(72) Inventors: Al Chakra, Apex, NC (US); Jonathan Dunne, Dungarvan (IE); Liam Harpur, Dublin (IE); Stanley K. Jerrard-Dunne, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/835,875

(22) Filed: Aug. 26, 2015

(65) Prior Publication Data

US 2017/0064532 A1    Mar. 2, 2017

(51) Int. Cl.
*H04W 8/00* (2009.01)
*H04W 4/20* (2009.01)
*H04W 8/24* (2009.01)

(52) U.S. Cl.
CPC .............. *H04W 8/005* (2013.01); *H04W 8/24* (2013.01)

(58) Field of Classification Search
CPC ....... H04W 8/005; H04W 8/24; H04W 12/02; H04W 12/06; H04W 48/10; H04W 4/02; H04W 4/206
USPC ...................................................... 455/422.1
See application file for complete search history.

(56) References Cited

U.S. PATENT DOCUMENTS

| 2006/0129510 | A1* | 6/2006 | Duplessis | H04L 67/36 |
| 2008/0175386 | A1* | 7/2008 | Bestermann | H04L 63/062 380/270 |
| 2009/0227290 | A1* | 9/2009 | Chien | G06F 21/6254 455/558 |
| 2011/0029362 | A1 | 2/2011 | Roeding et al. | |
| 2012/0054106 | A1* | 3/2012 | Stephenson | G06Q 30/0241 705/50 |
| 2013/0132850 | A1* | 5/2013 | Subramanian | H04L 41/12 715/735 |
| 2014/0010107 | A1* | 1/2014 | Chikkappa | H04W 4/06 370/254 |
| 2014/0071974 | A1* | 3/2014 | Watari | H04L 9/0866 370/338 |
| 2015/0040118 | A1 | 2/2015 | Adler et al. | |

(Continued)

FOREIGN PATENT DOCUMENTS

CN    103052066 A    4/2013
WO    2015016524 A1    2/2015

OTHER PUBLICATIONS

Beal, Vangie, "SSID—service set identified", What is Service Set Identifier (SSID)? Webopedia, last printed on Aug. 13, 2015 8:24AM, <http://www.webopedia.com/TERM/S/SSID.html>, pp. 1-2.

(Continued)

*Primary Examiner* — Nathan Taylor
(74) *Attorney, Agent, or Firm* — Steven F. McDaniel

(57) ABSTRACT

There is provided a method for determining identifying information of a wireless network. The method comprises receiving user or device information from a device determined to be both connectable to the network and within a predetermined range of the network. The method further comprises determining identifying information of the wireless network based on the received user or device information. A computer program product and system corresponding to the method are also disclosed.

9 Claims, 4 Drawing Sheets

(56) References Cited

U.S. PATENT DOCUMENTS

2015/0040168 A1 2/2015 Coburn, IV et al.
2015/0358892 A1* 12/2015 Pandey ................ H04W 48/10
370/254

OTHER PUBLICATIONS

Chakra et al., "Wireless Network Identification", U.S. Appl. No. 15/196,542, filed Jun. 29, 2016, 27 pages.
IBM Appendix P, list of patents and patent applications treated as related, Jun. 29, 2016, 2 pages.

* cited by examiner

WIRELESS NETWORK IDENTIFICATION

BACKGROUND

The present invention relates to the field of wireless networks, and more specifically, to identifying information for a wireless network. Recently, there has been an increasing trend in the use of devices that desire wireless network connectivity, for example, smartphones or laptops. Such devices may selectively connect to a wireless network to enable the devices to access, for example, the internet.

Conventional wireless networks are associated with identifying information. For example, a wireless network may be labeled with an identifying name. For example, a Wi-Fi local network is typically associated with a service set identifier (SSID). In use, a user of a wirelessly connectable device may select which wireless network to connect to by recognizing or identifying a wireless network by its identifying information.

SUMMARY

According to an embodiment there is provided a computer-implemented method of determining identifying information for a wireless network. The method comprises detecting the presence of a device connectable to the wireless network and in a predetermined range of the wireless network; receiving user or device information associated with the device; and determining identifying information for the wireless network based on the received user or device information.

According to another embodiment there is provided a processor for determining identifying information of a wireless network. The processor is adapted to detect a device connectable to the wireless network and in a predetermined range of the wireless network. The processor is also adapted to receive user or device information associated with the device and determine identifying information for the wireless network based on the received user or device information.

BRIEF DESCRIPTION OF THE DRAWINGS

Embodiments of the present invention will now be described, by way of example only, with reference to the following drawings, in which.

DETAILED DESCRIPTION

Figure 1:
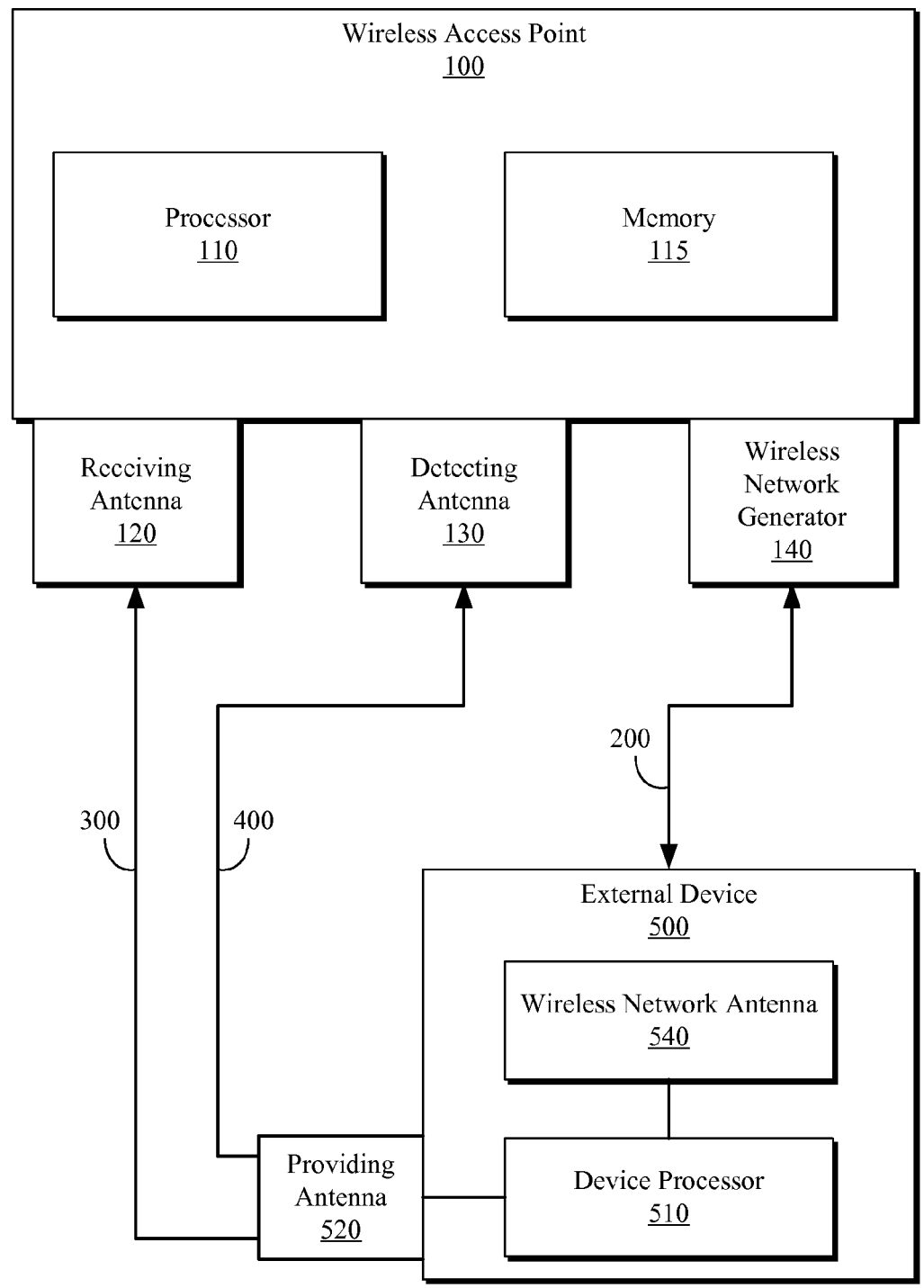
FIG. 1 illustrates a wireless access point comprising a processor according to a first embodiment and a device connectable to a wireless network associated with the wireless access point.

It should be understood that the Figures are merely schematic and are not drawn to scale. It should also be understood that the same reference numerals are used throughout the Figures to indicate the same or similar parts.

With reference now to FIG. 1, the basic operation of a wireless access point 100 according to an embodiment may be readily described.

The wireless access point 100 comprises a processor 110, a memory 115, a wireless network generator 140, an information receiving antenna 120 and device detecting antenna 130.

The wireless network generator 140 is adapted to generate a wireless network 200 for connecting an external device 500 to the wireless access point 100. In generating the wireless network, the wireless network generator may transmit a particular signal which may be received by an external device 500.

A skilled person would readily understand that the wireless network 200 may consist of any suitable wireless communication protocol for connecting at least two electronic devices together in a network (e.g., Wi-Fi local network, cell phone networks, Bluetooth connections and so on).

Typically, such a wireless network 200 is associated with identifying information for naming or otherwise describing the wireless network. The identifying information may, for example, be an identifying name or a portion of an identifying name of the wireless network. In other examples, the identifying information is a description or a portion of a description of the wireless network.

In at least one embodiment, the wireless network 200 is a Wi-Fi local network, and the identifying information of the wireless network is a service set identifier (SSID) of the wireless network. As readily understood by the skilled person, the SSID acts as an identifying name of the wireless network 200. In such embodiments, the wireless access point may be considered to provide a 'hotspot' for providing internet access to a connected device.

The processor 110 is adapted to determine the identifying information for the wireless network 200. In other words, the processor may select or generate identifying information used in naming or otherwise describing the wireless network.

By way of example, the processor 110 may be adapted to select from a list of predetermined identifying names of the wireless network (e.g., stored on the memory 115), such that a name/label of the wireless network may only be one of a predetermined set of names. In other embodiments, the processor may dynamically generate an identifying name of the wireless network, such that a name/label of the wireless network is not necessarily one of a predetermined set of names.

The determining of the identifying information for the wireless network is based upon user or device information associated with the device connectable to the wireless network and within a predetermined range of the wireless network. In other words, the processor is adapted to receive user or device information, and determine identifying information of the wireless network dependent upon this user or device information.

The processor 110 receives such user or device information via the information receiving antenna 120. That is to say, the information receiving antenna 120 of the wireless access point is adapted to receive (e.g., from the device 500) user or device information 300 of the device for transmittal to the processor 110 so as to allow the processor 110 to receive the user or device information.

In particular examples, the processor 100 receives the user or device information directly from the device 500. For example, the device may emit a first signal 300 at a particular, predetermined frequency, which the information receiving antenna receives. The first signal 300 may comprise user or device information upon which the determining of the identifying information is dependent upon.

The user or device information comprises information concerning the device itself or a user of the device. For example, the user or device information may comprise a device identifier so as to enable the processor to recognize an identifying name of the device. The processor may use this device identifier to select or generate user or device specific identifying information for the wireless network.

In other or further embodiments, the user information comprises social data of the user (for example, information relating to a user's birthday, recent social media updates and so on). Further examples of possible user or device information that the processor may receive include information relating to: an age of the user; a name of the user; a gender of the user; a demographic of the user; an education level of the user; a preference of the user; a dislike of the user; a browsing habit of the user; a personality trait of the user; a device type of the device (e.g., a brand of a device); proximity of similar devices and so on.

Determining identifying information of a user based upon user or device information advantageously enables the identifying information to be made specific to a particular user. This may enable the wireless network to be more attractive to a user, and thereby encourage the user to connect to the wireless network. This is particularly, although not exclusively, advantageous in paid services (where a user must pay to connect to a wireless network) and in the case of ensuring a reputation for connective reliability. It has been identified that an influencing decision in the choosing of which wireless network a user connects to may be the identifying information of the wireless network.

Thus, an embodiment provides a mechanism for determining identifying information of a wireless network which may attract a user to connect to the wireless network.

Furthermore, encouraging a user to connect to a particular wireless network in this manner has advantages in terms of advertisement. In particular the user or device information may be used to create bespoke advertisements that are more directed to a user. In certain embodiments, the identifying information may be advertising a certain product, so as to enable greater, but specific, exposure of the product through advertising to certain users of connectable devices.

The processor is adapted to establish whether a device connectable to the wireless network is within a predetermined range of the wireless network. The processor is optionally adapted to only receive user or device information from those devices within the predetermined range of the wireless network. In other words, the device 500 associated with the user or device information (from which the identifying information is determined) is preferably no more than a certain distance away from the wireless access point 100. This distance may, for example, be a maximum range of the wireless network.

The detecting of the presence of a device connectable within the network may comprise detecting electromagnetic signals, in particular radio-frequency signals that such devices may emit. For example, the wireless access point may detect, via a dedicated device detecting antenna 130, a radio frequency signal 400 emitted by the external device 500 connectable to the network (e.g., a smartphone or cell phone operating on a particular cellular network). The proximity of the device to the wireless network may be determined, for example, based on the signal strength of the radio-frequency signals.

The device 500 connectable to the wireless network 200 comprises a wireless network antenna 540, a device processor 510 and an information providing antenna 520.

The wireless network antenna 540 is adapted to allow the device 500 to connect to the wireless network 200. The device processor 510 is adapted to generate or otherwise determine (e.g., select from a memory of the device) device or user information for provision to the wireless network generator 100. The information providing antenna 520 is adapted to communicate with the information receiving antenna 120 so as to pass the user or device information 300 to the processor 110 of the wireless access point 100.

In common use, a visual output device (not shown) may visually display a name or descriptor of the wireless network to the user of the device 500, such that a user may select the name or descriptor to connect to the wireless network. In other embodiments, the wireless network is hidden, such that there is no visual display of a name or descriptor to the user of the device. In such embodiments however, the identifying information of the network is still present.

Other embodiments of devices capable of connecting to the wireless network 200 will be readily apparent to the skilled person. For example, the information providing antenna and the wireless network antenna may be combined into a single antenna capable of communicating with the wireless access point.

Figure 2:
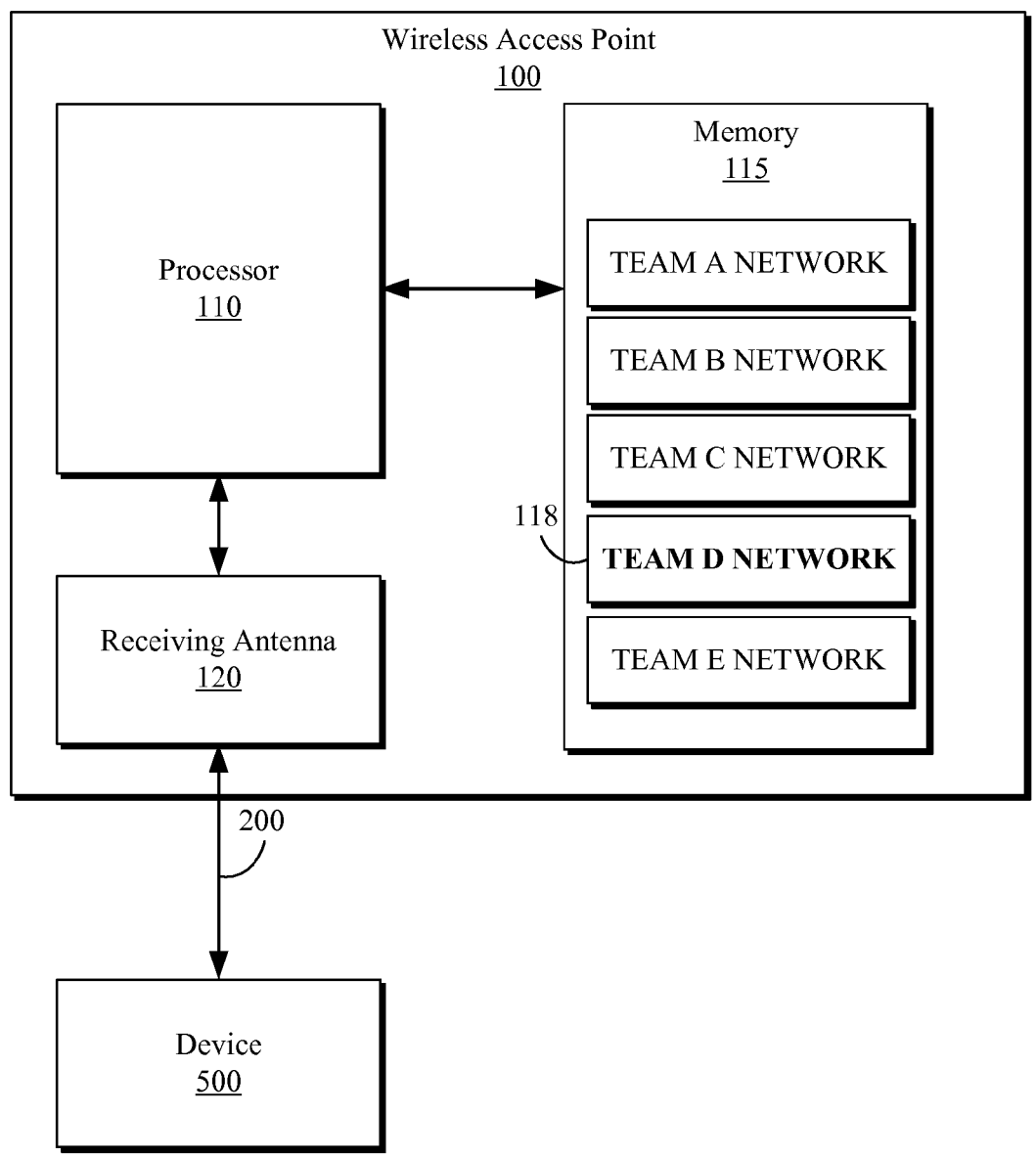
FIG. 2 conceptually depicts an operation of the wireless access point comprising the processor according to the first embodiment.

An exemplary operation of a processor according to an embodiment may be described with reference to FIG. 2.

A memory 115 of the wireless access point 100 stores a list of possible identifying names for the wireless network 200. The possible identifying names presently relate to various teams (e.g., sports teams or work teams) which may be attractive to a potential user of a device connectable to the network.

The processor 110 receives user or device information 300 associated with the device connectable to the network and within a predetermined range of the network. The user or device information comprises information relating to a preferred team of the user of the device.

The processor 110 communicates with the memory 115 of the wireless access point so as to select an identifying name from the list of possible identifying names based on the user or device information.

For example, the user or device information 300 consists of an identification of a user's preferred team (e.g., 'Team D'). The processor is adapted to dynamically select from the memory the most suitable network name (e.g., 'Team D Network') based upon the user's preferred team. Thus, the processor determines identifying information (e.g. an identifying name) for a network based upon the user or device information of the device 500.

The processor may therefore determine identifying information by comparing the received user or device information to a list of possible identifying names of the wireless network.

The processor passes the selected identifying name 118 for the wireless network to the wireless network generator 140. The wireless network generators either generates a new wireless network having the selected identifying name, or amends an identifying name of an existing wireless network to recite the selected identifying name. Thus, a wireless network 200 having the selected identifying name is provided for connection with the device 500.

It will be readily apparent to the skilled person that the identifying information is not only limited to comprising an identifying name of the wireless network. For example, the processor may append or prepend identifying information onto a predetermined identifying name. In other embodiments, the identifying information is provided as a descriptor only accessible when the identifying name of the wireless network is selected or highlighted by a user of the device.

The identifying information may, in some other or further embodiments, be formed as an aspect of information to be displayed to the user upon attempting to connect to the network. In other words, the wireless network may only allow full connection to the wireless network upon displaying information based, at least partially, on the identifying information. Partial connection may, for example, be understood to mean that the device may only communicate with the wireless access point, whereas full connection may mean the wireless access point may allow the device to communicate with further devices connected to the wireless network (e.g., via the internet).

In some embodiments, the identifying information may be used to identify a particular user and always present that user with the same named wireless network. For example, a processor may be able to identify a particular user through the user or device information (e.g., by recognizing a name of the user or device). The wireless access point may be able to present the device with a wireless network having a particular identifying name that the user may recognize, so as to enable the user to always connect to a wireless network having the same name. This may advantageously reduce the number of network names that a device or user must remember or store.

In determining the identifying information based upon the user or device information, the processor 110 may be adapted to analyze the user or device information so as to predict an attribute of the user. The predicted attribute may then be used in the determination of the identifying information of the network.

By way of example only, the user or device information may comprise a name of the device. The processor may be adapted to analyze the name of the device so as to determine a demographic or personal preference of the user. The identifying information may be determined based on this predicted attribute.

For example, if a device is named 'Scholar_54', the processor may predict that the user is a student or recent graduate. The processor may, based upon the predicted attribute, generate an identifying name for the network, for example, 'Free Student Wi-Fi'.

The predicted attribute of the user is not limited to only a demographic or personal preference. For example, a predicted attribute may comprise any number of the following: a name; an age; a gender; a hobby; a preference; a demographic; an education level; a language proficiency; browsing habits; a wireless provider; personality trait; a mobile phone operator; a device identity; and a device name.

A preference of the user may, for example, comprise an indication of: a user's preferred sport or sports team; a user's preferred books or author; a user's preferred television genre or programs; a user's preferred films or film genre; and/or a user's preferred actor or actress.

A demographic may provide an indicator of, for example, a user's profession; a user's home city; a user's relative financial position and so on. Browsing habits may, for example, indicate if a user has a propensity or preference for visiting particular genres of online sites (e.g., shopping sites, sport related sites or news sites).

It is therefore apparent that predicted attributes may be readily determined and used to determine identifying information of the wireless network.

Methods of predicting an attribute of a user would be readily realized by a person skilled in the art. For example, an attribute may be associated with a list of 'keywords', each of which is compared to the user or device information so as to predict the most appropriate attribute based on the best comparison.

In other or further embodiments, a processor may be adapted to extract data comprising a keyword or key phrase from the device or user information. The processor may, for example, compare this keyword or key phrase to a list of keywords to determine suitable identifying information. For example, an extracted keyword from the device or user information might be 'Football', and this extracted keyword might be in a list of keywords under a subject-header 'Soccer'. The processor may thereby generate a wireless network comprising identifying information relating to soccer.

In other embodiments, the identifying information is automatically generated on the basis of the keyword. In particular, the identifying information may comprise the keyword or key phrase. For example, an extracted key word might be 'Football', and the generated identifying information may be an identifying name of the wireless network, the identifying name being 'Cheap Wi-Fi for Fans of Football'.

In embodiments the generated or selected identifying information may be simply appended onto already existing identifying information, for example, appending further text onto an existing identifying name of the wireless network.

According to some embodiments, the processor receives the user or device information indirectly. For example, the device 500 may be adapted to communicate with a cell tower (not shown), the cell tower being adapted to pass user or device information for the device to the processor 110.

In some embodiments, the processor receives a device or user identifier of the device, and passes this device or user identifier to a central database or server. This enables the processor to receive from the central database the user or device information for the device. For example, a processor may receive user information consisting of a name of the user, and search (e.g., using an internet search engine) for further information related to that name.

It is possible that the wireless access device 100 performs no interaction with the device 500 prior to determining the identifying information of the wireless network 200. In one example, the device updates location information of the device on a central database (e.g., stored on an external server). The central database may be adapted to recognize the location, and pass user or device information of the device to a nearby wireless access device for provision to the processor of that wireless access device.

The processor may be adapted to infer the device or user information of the device from contextual information. For example, the processor may be adapted to receive information from a location sensor of the wireless access point so as to determine a location of the wireless access point and thereby infer a location of the device (e.g., as the device must necessarily be in the same approximate location of the wireless access point). In other such embodiments the processor may be adapted to receive a signal from a thermometer, a barometer, an altimeter, a pressure sensor and so on.

A device 500 may be adapted such that a user may 'opt-in' to the service and may, for example, permit or deny certain user or device information to be provided to the processor of a wireless access device. A processor need not receive the same type of user or device information from each device connectable to the network, but rather dynamically determine identifying information based on received user or device information.

In some embodiments, the identifying information is further based on environmental or contextual information. For example, a location of the wireless network; an air temperature in the vicinity of the wireless network; a humidity in the vicinity of the wireless network; a signal strength of the network relative to the device; a number of devices connected to the wireless network; a speed of the wireless network; a length of time the wireless network has been active; weather conditions; number of times a wireless network has been accessed and so on.

In some embodiments, the presence of a device within a predetermined range of the wireless network may be determined by detecting signals emitted by the device connectable to the wireless network on frequencies based on other wireless communication protocols. Suitable wireless communication protocols include an infrared link, Zigbee, Bluetooth, a wireless local area network protocol such as in accordance with the IEEE 802.11 standards, a 2G, 3G or 4G telecommunication protocol, and so on. Other formats will be readily apparent to the person skilled in the art.

It will also be clear to the person skilled in the art that other methods of detecting the presence of a device connectable to the wireless network are readily available, for example, using an electromagnetic sensor to detect the presence of an electronic device within a predetermined area of the wireless network.

In other or further embodiments devices connectable to the network may periodically pass the location of the devices to a database (not shown) with which the processor 110 of the wireless access point 100 may communicate. The processor 110 may be adapted to determine whether a device 500 connectable to the network is within a predetermined range of the wireless network based on information received from the database. Such a database may be external to both the device and the wireless access point, for example, stored on an external server.

Figure 3:
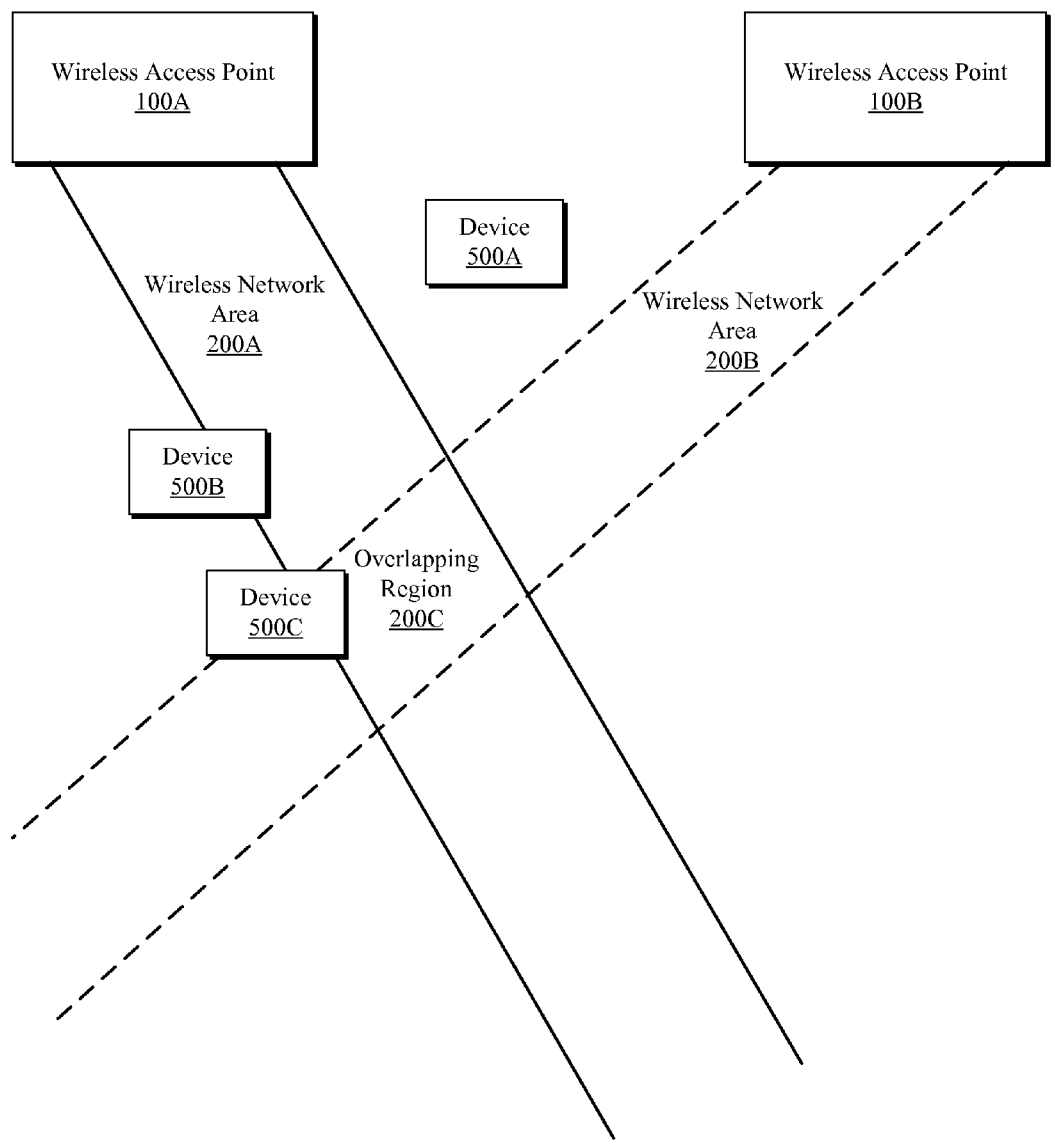
FIG. 3 illustrates a wireless access arrangement according to a second embodiment.

With reference now to FIG. 3, an embodiment of a wireless access arrangement according to an embodiment may be readily described.

Identified in FIG. 3 is a first wireless access point 100A and a second wireless access point 100B. Each wireless access point 100A, 100B is adapted to transmit a wireless network in a single direction. In other words, the first wireless access point 100A is adapted to emit a wireless network in a first direction, and the second wireless access point is adapted to emit the same wireless network in a second direction.

Directional emission of a wireless network is easily realizable using, for example, a directional antenna adapted to transmit and receive signals in substantially a single direction.

Each wireless network in a particular direction may be associated with a wireless network area, being that area in which a device may connect to the network. For example, the wireless network emitted in the first direction is associated with a first network area 200A, and the wireless network emitted in the second direction is associated with a second network area 200B.

Positioned around the first and second wireless access points are a first device 500A, a second device 500B, and a third device 500C. Each device has the capability to connect to a wireless network emitted by the first and second wireless access point.

The first device 500A is positioned so as to lie neither in the first network area 200A nor the second network area 200B. Thus, the first device 500A is not able to connect to the wireless network. In particular embodiments, the first device may be unable to recognize the existence of the wireless network as does not fall within any network area associated with the wireless network.

Contrarily, the second device 500B is positioned to lie in the first network area 200A. Thus, the second device 500B may be able to recognize the existence of the wireless network and connect to it.

In a further embodiment, a device may only connect to a wireless network when in an overlapping region 200C of the wireless network in the first direction 200A and the wireless network in the second direction 200B.

Thus, in such an embodiment, as the second device 500B is not positioned to lie in an overlapping region 200C of the wireless network in the first direction and the wireless network in a second direction, the second device 500B cannot connect to the wireless network.

Contrarily, a third device 500C, positioned to lie in this overlapping region 200C, is permitted to connect to the wireless network.

To ensure that only devices in the overlapping region 500C may connect to the network, various techniques may be used. For example, the first wireless access point 100A may be configured to only transmit signals for the wireless network, whereas the second wireless access point 100B may be configured to only receive signals for the wireless network. Thus, full access to the network may only be granted when in the overlapping region.

In another example, a first transmission of the wireless network in the first direction or a second transmission of the wireless network in a second direction may, alone, be below a threshold signal strength for a device to connect to the wireless network. In an overlap region the signal strength of the combined first and second transmission may be of sufficient signal strength for a device to connect to the network (i.e. above a threshold signal strength).

Such an embodiment may advantageously allow a particular wireless network having particular identifying information to be provided to a specific device. This may allow for a more secure service to be provided for a device, as a specific device may be required to be in a specific position and connect to a desired name to access the network.

Although in the wireless access arrangement described with reference to FIG. 3, the wireless network emitted by the first and second wireless access points are identical, it is conceivable that in alternative embodiments, the wireless networks are different so as to provide a separate wireless network for two devices or a choice of wireless networks for a single device.

In preferable embodiments, a single wireless access point is adapted to transmit a plurality of different wireless networks in a particular direction. This may make available to a device positioned in the same direction from the single wireless access point a plurality of wireless networks. This will advantageously increase the chances that a user may select a wireless network associated with the wireless access point.

In other embodiments, two or more wireless networks are made available in two or more directions, so as to allow a plurality of devices positioned in different directions from the wireless access point to connect to a wireless network.

In some embodiments, a single wireless access point is adapted to transmit a plurality of different wireless networks in a general direction (i.e., substantially radially), to increase the likelihood of a user in the general vicinity connecting to the wireless access point.

Figure 4:
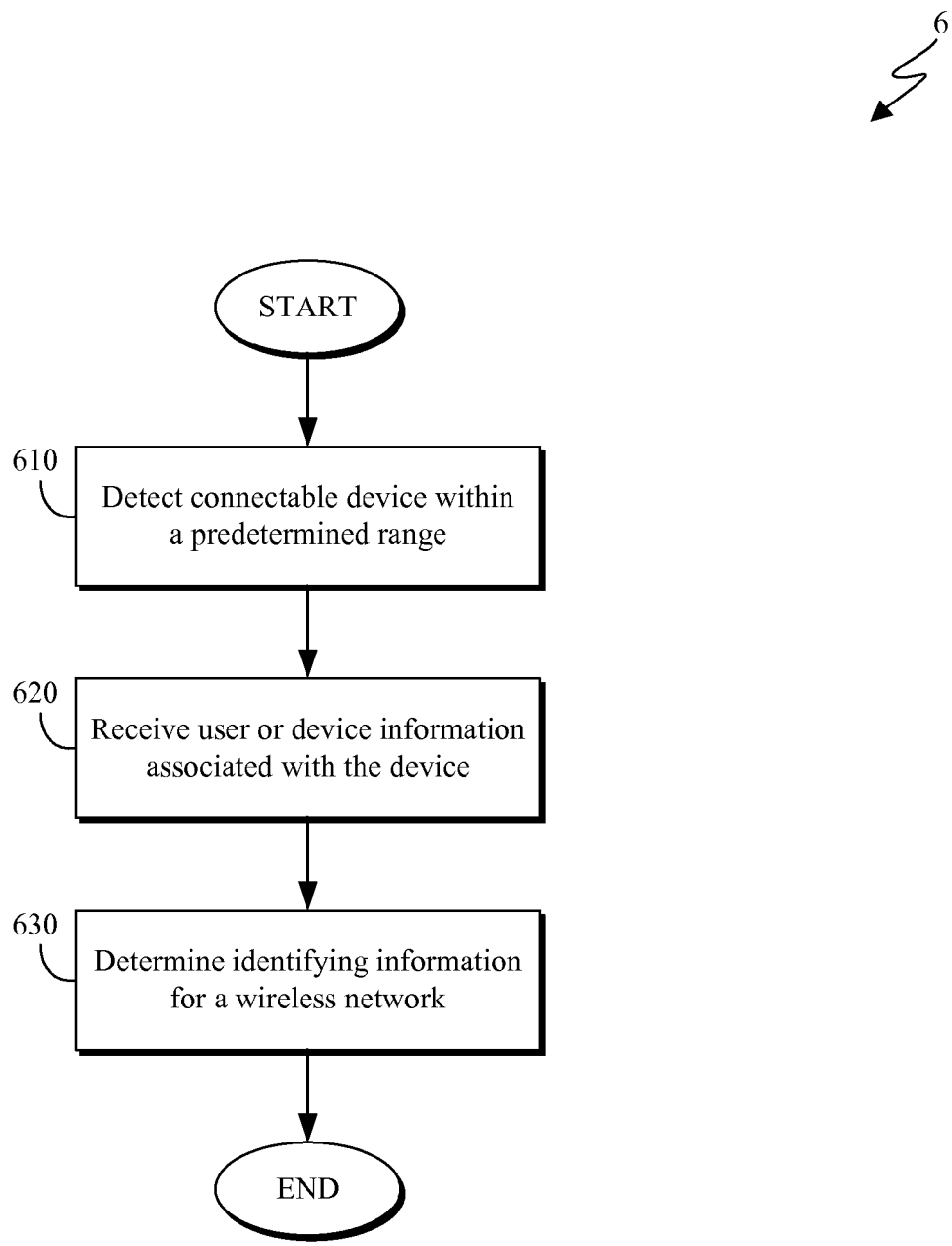
FIG. 4 shows a conceptual flow-chart of a method of determining identifying information of a wireless network according to an embodiment.

With reference to FIG. 4, a method 6 of determining identifying information for a wireless network can be described. The method 6 comprises detecting 610 the presence of a device within a predetermined range of the wireless network and connectable to the wireless network; receiving 620 user or device information associated with the device; and determining identifying information for the wireless network.

The method optionally further comprises generating a wireless network having the determined identifying information. In optional embodiments, the method comprises analyzing the user or device information so as to predict an attribute of the user, the identifying information may be determined based upon this predicted attribute.

In the context of the present application, where embodiments of the present invention constitute a method, it should be understood that such a method is a process for execution by a computer, i.e. is a computer-implementable method. The various steps of the method therefore reflect various parts of a computer program, e.g., various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising:
   one or more computer readable storage media and program instructions stored on the one or more computer readable storage media, the program instructions comprising instructions to:
   detect a device connectable to a wireless network that is within a predetermined range of the wireless network;
   receive user information associated with the device;
   generate identifying information for the wireless network based on the received user information; and
   provide the generated identifying information for the wireless network to the detected device.

2. The computer program product of claim 1, further comprising program instructions to:
   select identifying information of the wireless network from a plurality of pieces of identifying information for the wireless network based on the received user information.

3. The computer program product of claim 1, further comprising program instructions to:
   receive device identifying information for identifying the device connectable to the wireless network and within the predetermined range of the wireless network; and
   pass the device identifying information to a database so as to receive user information associated with a user having the device connectable to the wireless network and in the vicinity of the wireless network.

4. The computer program product of claim 1, further comprising instructions to:
   analyze the user information to provide a predicted attribute of the user; and
   determine identifying information for the wireless network based on the predicted attribute of the user.

5. A system comprising:
   one or more computer processors;
   one or more computer-readable storage media;
   program instructions stored on the computer-readable storage media for execution by at least one of the one or more processors, the program instructions comprising instructions to:
   detect a device connectable to a wireless network that is within a predetermined range of the wireless network;
   receive user information associated with the device;
   generate identifying information for the wireless network based on the received user information; and
   provide the generated identifying information for the wireless network to the detected device.

6. The system of claim 5, further comprising program instructions to:
   select identifying information of the wireless network from a plurality of pieces of identifying information for the wireless network based on the received user information.

7. The system of claim 5, further comprising program instructions to:
   receive device identifying information for identifying the device connectable to the wireless network and within the predetermined range of the wireless network; and
   pass the device identifying information to a database so as to receive user information associated with a user having the device connectable to the wireless network and in the vicinity of the wireless network.

8. The system of claim 5, further comprising instructions to:
   analyze the user information to provide a predicted attribute of the user; and
   determine identifying information for the wireless network based on the predicted attribute of the user.

9. The system of claim 8, wherein the predicted attribute of the user comprises at least one of the following: a name; an age; a gender; a hobby; a preference; a demographic; an education level; a language proficiency; browsing habits; a wireless provider; personality trait; a mobile phone operator; a device identity; and a device name.

* * * * *